2,591,713

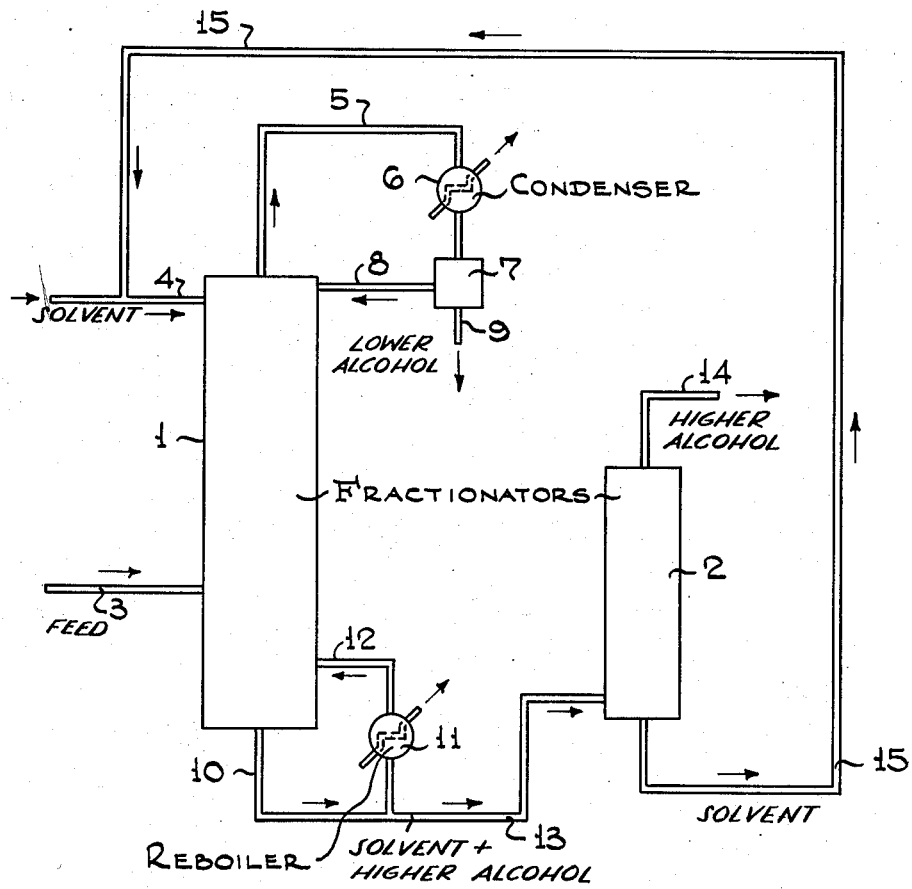
Charles E. Morrell
Carl S. Carlson
Paul V. Smith Jr.
Inventors
By Henry Berk Attorney Patented Apr. 8, 1952

UNITED STATES PATENT OFFICE 2,591,713

EXTRACTIVE DISTILLATION OF ALCOHOL-CONTAINING MIXTURES

Charles E. Morrell, Westfield, Carl S. Carlson, Elizabeth, and Paul V. Smith, Jr., Westfield, N. J., assignors to Standard Oil Development Company, a corporation of Delaware Application September 16, 1947, Serial No. 774,240

7 Claims. (Cl. 202—39.5)

This invention relates to a practical method of separating close-boiling oxygenated organic compounds and is concerned with the controlled use of a relatively high-boiling alcohol as a refluxing medium in a continuous fractional distillation of the close-boiling oxygenated compounds.

In copending application Serial No. 768,440, filed August 13, 1947, it is proposed to fractionate close-boiling oxygenated compounds by fractionally distilling the oxygenated compounds in the presence of a large excess of a hydrocarbon oil which is liquid under the conditions obtaining in the fractionation zone. In such a system the volatilities of the compounds are altered to such an extent that separations are possible which are difficult to obtain by ordinary fractionation. Generally speaking the volatilities of the lower molecular weight compounds are enhanced over those of the higher molecular weight compounds; however, with certain compounds the volatility relationships are reversed, so that certain higher molecular weight compounds may be rendered more volatile than certain lower molecular weight compounds. For example, when distilling a mixture of ethyl alcohol and acetone, the acetone, which is normally more volatile than ethyl alcohol is rendered less volatile than the ethyl alcohol and the latter is taken off overhead. However, in any given homologous series, there is no reversal of volatility and separations according to molecular weight are enhanced.

There are, however, a number of disadvantages in employing straight hydrocarbons as a reflux medium in separating such oxygenated compounds. In the first place, solubility relationships are such that only small amounts of water can be present without separation of two liquid phases. Such liquid phase separation is generally quite undesirable in such system since it results in loss of selectivity. Furthermore, in order to prevent entrainment of the hydrocarbon overhead with the alcohol products, both in the fractionation stage and in the subsequent stage of stripping the alcohol from the hydrocarbon, it is necessary to use a hydrocarbon of relatively high boiling point. This high initial boiling point of the hydrocarbon results in high tower temperatures and in the necessity for using large amounts of high pressure steam for reboiling.

It is, therefore, an object of this invention to provide a commercially feasible process for the efficient separation of close-boiling oxygenated compounds which are difficult to separate by ordinary fractional distillation methods, while avoiding the difficulties of limited miscibility and high-boiling point encountered when using hydrocarbons as the refluxing medium.

The objects of this invention are accomplished by fractionating the mixture of close-boiling oxygenated compounds in the presence of a large excess of an alcohol which is higher boiling than the highest boiling compound to be separated or a mixture of a liquid hydrocarbon and a high-boiling alcohol.

The process of this invention is best applied to distillation cuts or mixtures, the components of which distill within a narrow range; however, it may be applied to wide-boiling mixtures as well. The invention is particularly directed to the separation of alcohols of different types and molecular weights from one another and to the separation of alcohols as a class or one particular alcohol from other oxygenated compounds such as ketones, acetals, esters, aldehydes, etc. Typical separations which can be made are ethyl from isopropyl alcohol, a mixture of ethyl and isopropyl alcohols from methyl ethyl ketone, ethyl from a mixture of isopropyl alcohol and methyl ethyl ketone, normal propyl from butyl and higher alcohols, a mixture of ethyl and isopropyl alcohols from other closely boiling oxygenated compounds and ethyl alcohol from a mixture of isopropyl alcohol with other oxygenated compounds, a mixture of alcohols from other oxygenated compounds.

The crude oxygenated mixture may contain amounts of water greater than, less than, or equal to the amounts corresponding to azeotropic compositions but in any case it must be miscible with the solvent in all portions of the fractionation zone.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, both containing oxygenated organic compounds. Narrow-boiling range mixtures which may be obtained by the ordinary distillation processes from aqueous solution are as follows:

TABLE I

*Narrow-boiling range alcohol mixtures*

| Group | Components | Normal B. Pt., °C. |
|---|---|---|
| I | Ethyl Alcohol | 78.5 |
|   | Isopropyl Alcohol | 82.3 |
| II | Ethyl Alcohol | 78.5 |
|   | Isopropyl Alcohol | 82.3 |
|   | Methyl Ethyl Ketone | 79.6 |
| III | Ethyl Alcohol | 78.5 |
|   | Isopropyl Alcohol | 82.3 |
|   | t-Butyl Alcohol | 82.8 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical crude ethanol cut obtained from a water layer of a Fischer synthesis process contains the following:

TABLE II

*Ethanol cut*

| Compound | Anhydrous B. Pt., °C. |
|---|---|
| Acetone | 56.5 |
| Methyl alcohol | 64.7 |
| n-Butyraldehyde | 75.7 |
| Ethyl acetate | 77.1 |
| Ethyl alcohol | 78.5 |
| Methyl ethyl ketone | 79.6 |
| Isopropyl alcohol | 82.3 |
| t-Butyl alcohol | 82.8 |
| Normal propanol | 97.2 |
| Methyl propyl ketone | 101.7 |
| Acetal | 103.2 |
| Water | 100.0 |

In such crude ethanol cuts, the kinds and relative quantities of the components vary greatly, but the major components are generally ethyl alcohol, isopropyl alcohol, methyl ethyl ketone and butyraldehyde. Repeated fractional distillations of the ethanol cuts were found to be of no avail for effecting isolation of pure ethyl alcohol or pure isopropyl alcohol. The difficulties encountered can be appreciated by reference to Table II which shows the overlapping of the boiling points.

To obtain the desired separation of purified organic components from mixtures like those mentioned with benefits of the present invention, the mixture is subjected to a continuous fractional distillation in a column of practical size, including a rectification zone and a stripping zone for countercurrent vapor-liquid contact under reboiling and refluxing conditions. A sufficiently large quantity of hydrocarbon liquid and/or a high-boiling alcohol is introduced at an upper part of a rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of hydrocarbon liquid and/or alcohol to the upper part of the rectification zone. The temperature of the hydrocarbon and/or alcohol introduced into the rectification zone is preferably close to the temperature of the liquid on its feed plate, although it may be lowered to partially condense vapors ascending to the solvent feed plate.

Since the efficient operation is essentially continuous, the hydrocarbon and/or alcohol is added continuously near the top of a fractionating column while the mixture of oxygenated organic compounds to be separated is fed continuously into the column at a lower point while sufficient heat is provided to afford distillation throughout the column.

The feed stream of the oxygenated organic compounds is preferably introduced into a fractionating column between an upper rectification section and a lower stripping section at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of a rectification zone in a fractionating column pass up through the rectification zone in contact with descending internal liquid reflux under practically equilibrium reboiling and refluxing conditions.

The quantity of hydrocarbon and/or alcohol required to be introduced continuously at the upper part of the rectification zone for accomplishing the desired separation of the close-boiling compounds is considerably greater than the quantity of condensate with which it becomes homogeneously mixed. This is necessary in order to make the hydrocarbon and/or alcohol concentration of the internal reflux substantially above a critical minimum in the range of 70-99 volume percent. With adequate hydrocarbon and/or alcohol concentration in the internal reflux for effecting the separation, the organic component to be isolated in the bottoms is dissolved in the internal reflux that reaches the bottom part of the rectification zone and finally the bottom of the stripping zone.

The minimum concentration in the internal reflux of the hydrocarbon and alcohol or of the alcohol, if used alone, for obtaining the separation depends on the particular organic compounds to be separated and varies between 70 and 99 volume percent. In a limiting case of isolating ethyl alcohol from isopropyl alcohol, essentially no separation is effected if the internal reflux contains less than 80 volume percent alcohol or hydrocarbon and alcohol, and for obtaining satisfactory results on a practical scale, more than 85 volume percent alcohol or hydrocarbon and alcohol, preferably 85-99 volume percent, is required in the internal liquid reflux. As the dilution of the internal reflux becomes infinite, the selectivity of separation is increased but the operation efficiency is excessively lowered on account of the relatively small quantities of the oxygenated organic compounds being processed.

Under steady state conditions existing in a continuously operating fractional distillation zone, the internal reflux being of adequate concentration for accomplishing the separation of the close-boiling alcohols and other oxygenated compounds, there tends to be a nearly constant alcohol or hydrocarbon-alcohol concentration in the homogeneous liquid phase on each plate above the oxy-compound feed point and on each plate below the oxy-compound feed point, although the average concentration on the plates above and below the oxy-compound feed point may differ. This internal reflux in flowing from the top to the bottom becomes richer in the oxygenated compounds having the lowest relative volatility in the presence of the alcohol or hydrocarbon and alcohol while the oxygenated compounds having the highest relative volatility in the alcohol or hydrocarbon and alcohol are distilled overhead.

The overhead vapors from the rectification zone are enriched in one or more of the organic components rendered relatively more volatile by the high boiling alcohol or the hydrocarbon and alcohol concentration in the liquid reflux while the remaining portion of the organic material introduced with the feed remains dissolved in the internal reflux.

The functioning of the stripping zone may be described as follows:

The mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of alcohol or hydrocarbon and alcohol is maintained in the liquid flowing down through the stripping zone, as in the rectification zone, to make the liquid progressively richer in oxygenated compounds having the lowest relative volatility in the alcohol or hydrocarbon and alcohol while the oxygenated compounds having the highest relative volatility in the alcohol or hydrocarbon and alcohol are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile freed of the more volatile compounds in the liquid may be withdrawn from a bottom part of the stripping zone.

The alcohol to be used as reflux medium according to the present invention depends upon the compounds to be separated as it must boil higher than any of these. For example, n-amyl alcohol is suitable for the separation of ethyl and the propyl alcohols, n-hexyl alcohol is suitable for separating the butyl alcohols from the amyl alcohols. The alcohol may be replaced in part by a hydrocarbon liquid which is liquid under the distillation conditions such as a refined white oil, pure paraffins, olefins, naphthenes, aromatics and mixtures of these or fractions of virgin or cracked stocks. The alcohol may comprise anywhere from 25% to 100% of the mixture.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

This invention will be described in detail as applied to the separation of ethyl alcohol and isopropyl alcohol from their aqueous azeotropes.

Referring to the drawing, a fraction is introduced by line 3 into the tower 1 where it is fractionated in the presence of a liquid stream of a mixture of 50 volume percent of an oil having a boiling point of 550° to 750° F. and 50 volume percent of n-amyl alcohol introduced through line 4. The conditions in the tower are such as to cause a distillation of the alcohol compounds in the presence of the oil and n-amyl alcohol on each plate of the tower. A sufficient amount of the oil-n-amyl alcohol mixture is added so that it is present to the extent of 90 volume percent on each plate above the oxy-compound feed point. As the vapors of the feed pass up the column some of them are dissolved in the large excess of oil and alcohol descending the column and are collected together with the oil and alcohol in pools on each plate. Conditions are maintained on each plate of the tower such that the liquid mixtures of the ethyl and isopropyl alcohols are at their boiling points in the solvent and are continuously being contacted with vapors boiled from the plates below. Because of the enhanced volatility of the ethyl alcohol in relation to the isopropyl alcohol the vapors are relatively rich in the former and poor in the latter. By maintaining the amount of oil and n-amyl alcohol on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus a suitable temperature and reflux conditions are maintained in the tower so that ethyl alcohol substantially free of other oxygenated-organic compounds appears in the overhead stream and isopropyl alcohol in the bottoms product. Any water present in the feed will appear with the overhead ethyl alcohol product.

Overhead vapors consisting substantially of pure ethanol and in some cases containing water are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product. If water in excess of the aqueous azeotrope is present, refractionation by standard techniques will reduce it.

Bottoms liquid consisting of a solution of isopropyl alcohol in oil and n-amyl alcohol collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where isopropyl alcohol is separated from the oil and n-amyl alcohol and removed overhead through line 14. Oil and n-amyl alcohol are removed from the bottom of the tower through line 15 and recycled to tower 1.

Representative data are given in the following table showing the application of this invention to the separation of various mixtures of oxygenated organic compounds. The relative volatility given in the table is the volatility of one component divided by that of the other, the volatility of each component being proportional to its partial pressure divided by its mol fraction in the liquid phase. It is also defined by the equation Alpha=$(y_1/y_2)/(x_1/x_2)$ where $y$ refers to the vapor phase mol fractions of the components to be separated and $x$ refers to the liquid phase mol fractions of the components to be separated, subscript one designates the more volatile component and subscript two the less volatile component.

*Relative volatility of various mixtures in presence of n-pentanol or a white oil [1]-n-pentanol mixture*

| Run No. | Components | | Charge | | Vapor Mol Per Cent | Sample Vol. Per Cent | Liquid Mol Per Cent | Sample Vol. Per Cent | Relative Volatility of A over B | Normal Alpha A over B |
|---|---|---|---|---|---|---|---|---|---|---|
| | | | Mol Per Cent | Vol. Per Cent | | | | | | |
| 494-12 | A. n-Propanol<br>B. sec-Butanol | }Binary Basis.. | { 70<br>30 | | 71.9<br>28.1 | | 69.3<br>30.7 | | 1.13 | 1.11 |
| | n-Pentanol | | | 90 | | 64.4 | | 90.6 | | |
| 494-13 | A. n-Propanol<br>B. sec-Butanol | }Binary Basis.. | { 30<br>70 | | 36.3<br>63.7 | | 28.8<br>71.2 | | 1.41 | 1.11 |
| | n-Pentanol | | | 90 | | 61.0 | | 90.4 | | |
| 494-55 | A. Ethanol<br>B. Isopropanol | }Binary Basis.. | { 30<br>70 | | 32.8<br>67.2 | | 22.2<br>77.8 | | 1.31 | 1.15 |
| | Water | | | 0.89 | | | | | | |
| | White Oil | | | 45 | | | | | | |
| | n-Pentanol | | | 45 | | | | | | |
| 494-71 | A. Ethanol<br>B. Isopropanol | }Binary Basis.. | { 44.5<br>55.5 | | 49.0<br>51.0 | | 41.1<br>58.9 | | 1.38 | 1.15 |
| | Water | | | 0.75 | | | | | | |
| | White Oil | | | 45 | | | | | | |
| | n-Pentanol | | | 45 | | | | | | |
| 494-57 | A. Ethanol<br>B. Isopropanol | }Binary Basis.. | { 70<br>30 | | 72.4<br>27.6 | | 65.9<br>34.1 | | 1.36 | 1.15 |
| | Water | | | 0.59 | | | | | | |
| | White Oil | | | 45 | | | | | | |
| | n-Pentanol | | | 45 | | | | | | |

[1] Highly treated kerosene fraction: B. P. 396-522° F., Sp. Gr. 0.800, Aniline Pt. 176° F., Flash 160° F., Vis./100° F., 30 SSU.

The nature and objects of the present invention having been thus fully set forth and specific examples of the same given, what is claimed as new and useful and desired to be secured by Letters Patent is:

1. A method of separating a lower molecular weight $C_1$ to $C_4$ alkanol from a high molecular weight oxygenated organic compound of the group consisting of alkanols and neutral oxygenated non-alcoholic organic compounds having no more than 5 carbon atoms per molecule, said lower molecular weight alkanol and the higher molecular weight oxygenated organic compounds to be separated being close-boiling, which comprises introducing a feed mixture containing both said lower molecular weight alkanol and higher molecular weight compound as components thereof into a fractional distillation zone wherein vapors of said mixture ascend countercurrently to a liquid reflux of condensate from said vapors dissolved in a liquid solvent consisting essentially of 25 to 100 volume percent higher-boiling alkanol having at least 5 carbon atoms per molecule and 0 to 75 volume percent hydrocarbon oil, the alkanol and hydrocarbon oil components of the liquid solvent being sufficiently higher-boiling than said components of the feed mixture to remain substantially liquid in said fractional distillation zone, supplying said liquid solvent to an upper part of said fractional distillation zone to form 85 to 99 volume percent of the internal liquid reflux, continuously removing from an upper part of the fractional distillation zone vapor of the lower molecular weight alkanol present in said feed mixture, said lower molecular weight alkanol being rendered relatively more volatile by the presence of said liquid solvent, and removing from a bottom part of the fractional distillation zone a dilute solution of the higher molecular weight oxygenated organic compound from the feed mixture dissolved in the liquid solvent.

2. The method of claim 1, in which up to an azeotropic amount of water is present with components of the feed mixture, and the water is distilled overhead with the lower molecular weight alkanol from the fractional distillation zone.

3. A process of separating an alkanol having less than 5 carbon atoms per molecule from a neutral non-alcohol oxygenated organic compound which is close-boiling thereto and difficult to separate therefrom by ordinary fractional distillation, said non-alcohol being of higher molecular weight than said alkanol, which comprises passing a vapor mixture of the non-alcohol with said alkanol up through a fractional distillation zone countercurrent to an internal liquid reflux which contains partial condensate from said vapor mixture homogeneously dissolved in a liquid solvent consisting of 25 to 100 volume percent alkanol having at least 5 carbon atoms per molecule and 0 to 75 volume percent hydrocarbon oil, the alkanol and hydrocarbon oil component being higher-boiling than the alkanol and non-alcohol present in said feed mixture, continuously introducing a sufficient amount of the liquid solvent into an upper part of the fractional distillation zone to maintain a concentration of from 85 to 99 volume percent of said solvent in the internal liquid reflux flowing down through the fractional distillation zone, continuously removing vapor of the lower molecular weight alkanol component from the vapor mixture overhead from the fractional distillation zone, and continuously removing the higher molecular weight non-alcohol component of the vapor mixture dissolved in the liquid solvent as bottoms.

4. The method of separating a lower molecular weight alcohol component from a close-boiling higher molecular weight alcohol component, said alcohol components being saturated monohydric $C_2$ to $C_4$ alcohols difficult to separate from a mixture thereof by ordinary fractional distillation, which comprises continuously introducing a feed mixture of said $C_2$ to $C_4$ alcohols into a fractional distillation zone wherein vapors of said alcohols ascend countercurrently to liquid reflux in a higher proportion of a substantially anhydrous liquid solvent consisting essentially of at least 25 volume percent of a saturated monohydric alcohol dissolved in a hydrocarbon oil, said alcohol and hydrocarbon oil in said solvent being higher-boiling than the $C_2$ to $C_4$ alcohols being separated and effecting enhanced vaporization of the lower molecular weight alcohol relative to the higher molecular weight alcohol present in said feed mixture, continuously removing vapor of the lower molecular weight alcohol component of the feed mixture overhead from the fractional distillation zone, and continuously removing a solution of the higher molecular weight alcohol of the feed mixture in said solvent as bottoms.

5. The process according to claim 4 in which ethyl alcohol is the lower molecular weight alcohol and isopropyl alcohol is the higher molecular weight alcohol of the feed mixture, ethyl alcohol being removed as vapor overhead, and isopropyl alcohol being dissolved in the liquid solvent as bottoms.

6. In a process of separating aqueous azeotropic mixtures of ethyl alcohol and isopropyl alcohol the steps which comprise continuously passing a solution of the ethyl alcohol in a substantially anhydrous liquid solvent consisting essentially of at least 25 volume percent n-amyl alcohol dissolved in a hydrocarbon oil which is liquid under the distillation conditions and containing isopropyl alcohol down through a stripping zone so that a liquid portion of the solution flows countercurrently in contact with alcohol vapor evolved therefrom under constant refluxing and reboiling conditions, maintaining a concentration of 85 to 99 volume percent of the solvent in the resulting internal reflux to effect vaporization of a larger part of the alcohol than of the isopropyl alcohol in said reflux, continuously withdrawing ethyl alcohol vapor overhead from the stripping zone at essentially the same rate that the ethyl alcohol dissolved in said solvent enters the stripping zone, and withdrawing from a bottom part of the stripping zone a residual solution of the isopropyl alcohol in the solvent substantially freed of ethyl alcohol.

7. A process according to claim 6 in which the solvent consists of 50 volume percent of n-amyl alcohol and 50 volume percent of the hydrocarbon oil which is liquid under the distillation conditions.

CHARLES E. MORRELL.
CARL S. CARLSON.
PAUL V. SMITH, JR.

REFERENCES CITED

The following references are of record in the file of this patent:

UNITED STATES PATENTS

| Number | Name | Date |
|---|---|---|
| 1,372,465 | Stevens | Mar. 22, 1921 |
| 1,422,583 | Lebo | July 11, 1922 |
| 1,459,699 | Van Ruymbeke | June 19, 1923 |
| 2,265,939 | Field | Dec. 9, 1941 |
| 2,273,923 | Bludworth | Feb. 24, 1942 |
| 2,290,442 | Metzl | July 21, 1942 |
| 2,392,534 | Von Keussler | Jan. 8, 1946 |
| 2,483,246 | Stribley et al. | Sept. 27, 1949 |